United States Patent
Knoplioch

(10) Patent No.: US 9,483,833 B2
(45) Date of Patent: Nov. 1, 2016

(54) REAL-TIME, INTERACTIVE IMAGE ANALYSIS

(71) Applicant: General Electric Company, Schenectady, NY (US)

(72) Inventor: Jerome Francois Knoplioch, Buc (FR)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/879,306

(22) Filed: Oct. 9, 2015

(65) Prior Publication Data
US 2016/0035101 A1 Feb. 4, 2016

Related U.S. Application Data

(62) Division of application No. 13/867,859, filed on Apr. 22, 2013, now Pat. No. 9,189,860.

(51) Int. Cl.
*G06T 7/00* (2006.01)
*G06T 15/08* (2011.01)
*G06T 19/00* (2011.01)

(52) U.S. Cl.
CPC .......... *G06T 7/0081* (2013.01); *G06T 7/0012* (2013.01); *G06T 15/08* (2013.01); *G06T 19/00* (2013.01); *G06T 2207/10072* (2013.01); *G06T 2207/20101* (2013.01); *G06T 2207/30196* (2013.01); *G06T 2210/41* (2013.01)

(58) Field of Classification Search
None
See application file for complete search history.

(56) References Cited

U.S. PATENT DOCUMENTS

| | | | |
|---|---|---|---|
| 6,658,019 B1 * | 12/2003 | Chen | H04L 1/1887 370/329 |
| 6,824,517 B2 | 11/2004 | Salgo et al. | |
| 7,145,966 B2 * | 12/2006 | Lai | H04L 27/22 375/227 |
| 7,191,101 B2 | 3/2007 | Knoplioch et al. | |
| 7,403,211 B2 | 7/2008 | Sheasby et al. | |
| 7,558,417 B2 | 7/2009 | Knoplioch et al. | |
| 7,565,000 B2 | 7/2009 | Capolunghi et al. | |
| 8,000,527 B2 | 8/2011 | Grady et al. | |

(Continued)

OTHER PUBLICATIONS

The United States Patent and Trademark Office, "Restriction Requirement", issued in connection with U.S. Appl. No. 13/867,859, mailed on Feb. 4, 2015, 5 pages.

(Continued)

*Primary Examiner* — Jingge Wu
(74) *Attorney, Agent, or Firm* — Hanley, Flight and Zimmerman, LLC

(57) ABSTRACT

Systems and methods for real-time, interactive image analysis are disclosed. An example system includes a computing device configured to: generate a segmentation of the image in real-time based on a position of a movable pointer on the display and update the segmentation based on a change to the position of the pointer on the display; generate a representation of the object based on the segmentation, wherein the representation is simplified from the image of the object and includes an outline of the object based on the generated segmentation including the first center and the first significant axis; calculate measurements for the object based on the segmentation including the first center and the first significant axis; and display the representation and the measurements via the display.

20 Claims, 7 Drawing Sheets

(56) References Cited

U.S. PATENT DOCUMENTS

| | | | |
|---|---|---|---|
| 8,019,133 B2 | 9/2011 | Knoplioch et al. | |
| 8,300,708 B2* | 10/2012 | Lamy-Bergot | H04N 21/2383 375/240.02 |
| 2002/0114296 A1* | 8/2002 | Hardy | H04L 12/2602 370/332 |
| 2002/0144209 A1* | 10/2002 | Ariel | H03M 13/27 714/792 |
| 2002/0175912 A1* | 11/2002 | Nishitani | G06T 19/00 345/419 |
| 2007/0116347 A1* | 5/2007 | Hong | G06T 7/0087 382/131 |
| 2007/0123773 A1* | 5/2007 | Fuchs | G06K 9/00147 600/410 |
| 2008/0222574 A1 | 9/2008 | Coyne | |
| 2009/0304070 A1* | 12/2009 | Lamy-Bergot | H04N 21/2383 375/240.02 |
| 2010/0063420 A1* | 3/2010 | Mahn | G06T 7/0012 600/594 |
| 2012/0026168 A1 | 2/2012 | Vik et al. | |
| 2013/0021372 A1* | 1/2013 | Wiemker | G06T 7/0012 345/629 |
| 2013/0050076 A1 | 2/2013 | Hong et al. | |
| 2014/0219534 A1* | 8/2014 | Wiemker | G06T 7/0012 382/131 |
| 2015/0035753 A1* | 2/2015 | Bystrov | G06F 3/03543 345/163 |

OTHER PUBLICATIONS

The United States Patent and Trademark Office, "Non-Final Office action", issued in connection with U.S. Appl. No. 13/867,859, mailed on Mar. 27, 2015, 8 pages.

The United States Patent and Trademark Office, "Notice of Allowance", issued in connection with U.S. Appl. No. 13/867,859, mailed on Jul. 10, 2015, 8 pages.

* cited by examiner

100

100

200

500

510

REAL-TIME, INTERACTIVE IMAGE ANALYSIS

CROSS-REFERENCE TO RELATED APPLICATION

The present application claims, as a divisional, the benefit of priority of U.S. patent application Ser. No. 13/867,859, filed on Apr. 22, 2013, for "REAL-TIME, INTERACTIVE IMAGE ANALYSIS", which is hereby incorporated by reference in its entirety.

BACKGROUND OF THE INVENTION

Many imaging applications utilize measurement tools for the analysis of images captured by imaging devices. Existing measurement tools typically rely on a process that involves a segmentation process, possibly followed by an editing process. However, the results of the segmentation process are often unreliable. Therefore, some users choose to calculate measurements for the images manually rather than utilize the measurement tools. However, the manual calculation of such measurements is very time-consuming and often produces inaccurate results.

In addition, according to current measurement tools, the segmentation process is non-interactive. Therefore, the quality of the segmentation results is dependent on the initial inputs provided to the measurement tools. This may result in a further decrease in the reliability of the segmentation results.

SUMMARY OF THE INVENTION

An embodiment relates to an imaging system for real-time, interactive image analysis. The imaging system includes an imaging device configured to capture an image of an object and a computing device that includes a display. The computing device is communicably coupled to the imaging device and is configured to acquire the image from the imaging device and generate a segmentation of the image in real-time based on a position of a pointer on the display. The imaging device is also configured to generate a representation of the object based on the segmentation, calculate measurements for the object based on the segmentation, and display the representation and the measurements via the display.

Another embodiment relates to a method for real-time, interactive image analysis. The method includes acquiring, at a computing device, an image of an object from an imaging device. The method also includes generating a segmentation of the image in real-time based on a position of a pointer on a display of the computing device, and generating a representation of the object based on the segmentation. The method further includes calculating measurements for the object based on the segmentation.

Still another embodiment relates to a medical imaging system. The medical imaging system includes a medical imaging device that is configured to capture an image of an imaging subject, as well as a workstation that includes a display. The workstation is communicably coupled to the imaging device and is configured to acquire the image from the imaging device and translate a position of a pointer on the display to a location on the image. The workstation is also configured to compute a section at the location, generate a segmentation of the image based on local data properties of the section, and determine a center and a significant axis corresponding to the segmentation. The workstation is further configured to calculate measurements for the object based on the segmentation of the image and display the representation and the measurements via the display.

BRIEF DESCRIPTION OF THE DRAWINGS

The present techniques will become more fully understood from the following detailed description, taken in conjunction with the accompanying drawings, wherein like reference numerals refer to like parts, in which.

DETAILED DESCRIPTION

As discussed above, current measurement tools often provide image segmentation results that are unreliable, largely due to the non-interactive nature of the segmentation process. Accordingly, embodiments described herein provide a computing system and method for real-time, interactive image analysis. Specifically, a two-dimensional, three-dimensional, or four-dimensional image is presented to a user via a display of a computing device. A segmentation of the image is generated based on a position of a pointer on the display. The segmentation is then used to generate a representation of an object corresponding to the image, as well as calculate specific measurements for the object. Furthermore, the segmentation of the image and, thus, the representation and measurements for the corresponding object, are updated in real-time as the position of the pointer on the display changes in response to feedback from the user.

In various embodiments, the interactive nature of the segmentation technique described herein increases the likelihood of generating a reliable segmentation of the image. Specifically, the use of real-time feedback in the form of pointer motion allows a large number of alternate segmentations to be easily and quickly displayed based on slightly different initial conditions. Furthermore, in some embodiments, the results obtained via the interactive segmentation technique described herein may be subsequently used to facilitate non-interactive segmentation and analysis techniques.

Figure 1A:
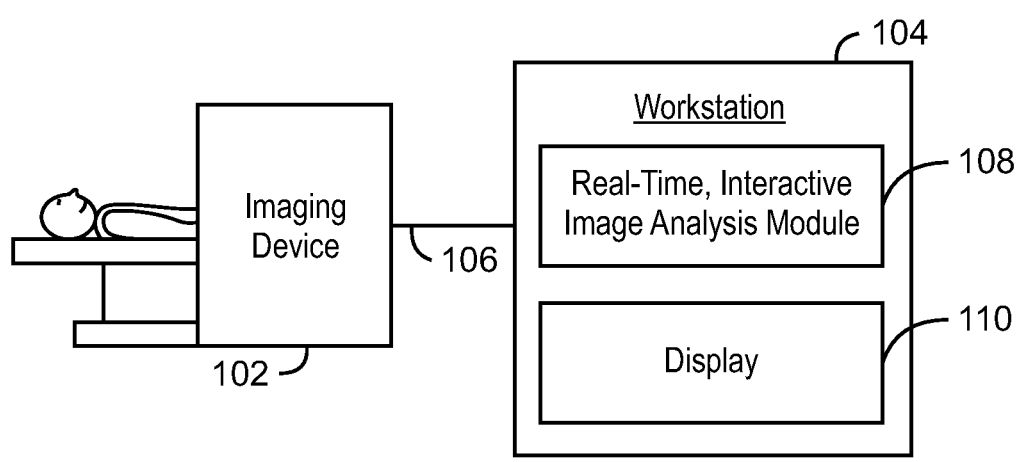
FIG. 1A is a block diagram of an imaging system for real-time, interactive image analysis.

FIG. 1A is a block diagram of an imaging system 100 for real-time, interactive image analysis. The imaging system includes an imaging device 102. The imaging device 102 is configured to generate digitized images (or videos) based on an imaging subject, or object. The imaging subject may include, but is not limited to, a portion of the human anatomy, as shown in FIG. 1A.

In various embodiments, the imaging device 102 may be any suitable type of medical imaging device. For example, the imaging device 102 may be a magnetic resonance imaging (MRI) device, an ultrasonic imaging device, a computed tomography (CT) device, a nuclear imaging device, an X-ray imaging device, a positron emission tomography (PET) device, a molecular imaging device, a three-dimensional angiography imaging device, or the like. Further, in some embodiments, the imaging device 102 may be any other suitable types of imaging device that is not related to the medical field. In various embodiments, the imaging device 102 generates images in the DICOM3 file format or the DEFF file format. However, any other suitable image file format may also be used.

The images that are generated via the imaging device 102 may include two-dimensional, three-dimensional, and/or four-dimensional images. For example, the images may include two-dimensional slices or image information representative of two-dimensional slices through the imaging subject. As another example, the images may include a three-dimensional volume of all or a portion of the imaging subject, or image information representative of a three-dimensional volume of all or a portion of the imaging subject. As yet another example, the images may include four-dimensional images including a three-dimensional volume of all or a portion of the imaging subject in combination with one or more parameters, such as time, relating to the imaging subject (or the portion of the imaging subject).

The imaging device 102 is communicably coupled to a workstation 104 via a communications link 106. In various embodiments, the imaging device 102 sends images to the workstation 104 via the communications link 106. The communications link 106 may be a network that communicably couples the imaging device to the workstation 104, or may be a bus that directly couples the imaging device 102 to the workstation 104. The workstation 104 may include any suitable type of computing system that is capable of processing and analyzing images according to the embodiments described herein.

In various embodiments, the workstation 104 includes a real-time, interactive image analysis module 108. The real-time, interactive image analysis module 108 may include any suitable types of software, firmware, and/or hardware that provide for the segmentation and quantification of images. Further, in some embodiments, the real-time, interactive image analysis module 108 includes one or more non-transitory machine-readable storage media that provide for the segmentation and quantification of images.

The workstation 104 also includes a display 110. The display 110 may be a monitor, touch screen, or the like. Information relating to the segmentation and quantification of the images may be presented to a user of the workstation 104 in real-time via the display 110. In addition, the user may interact with, or provide feedback to, the real-time, interactive image analysis module 108 in order to direct the segmentation and quantification procedure. For example, the information that is displayed to the user may be updated in real-time as the user moves a pointer or cursor across the display 110.

In various embodiments, the user provides feedback to the real-time, interactive image analysis module 108 through a user interface that is presented to the user via the display 110. The user interface may allow the user to control the segmentation and quantification procedure for an image by moving the pointer to positions on the display 110 that correspond to specific locations on the image. In addition, the user interface may allow the user to adjust the information that is presented via the display 110. For example, the user may specify specific types of representations or specific measurements for the imaging subject represented by the image that are to be presented on the display 110.

The block diagram of FIG. 1A is not intended to indicate that the imaging system 100 is to include all of the components shown in FIG. 1A in every case. Moreover, any number of additional or alternative components not shown in FIG. 1A may be included in the imaging system 100, depending on the details of the specific implementation.

Figure 1B:
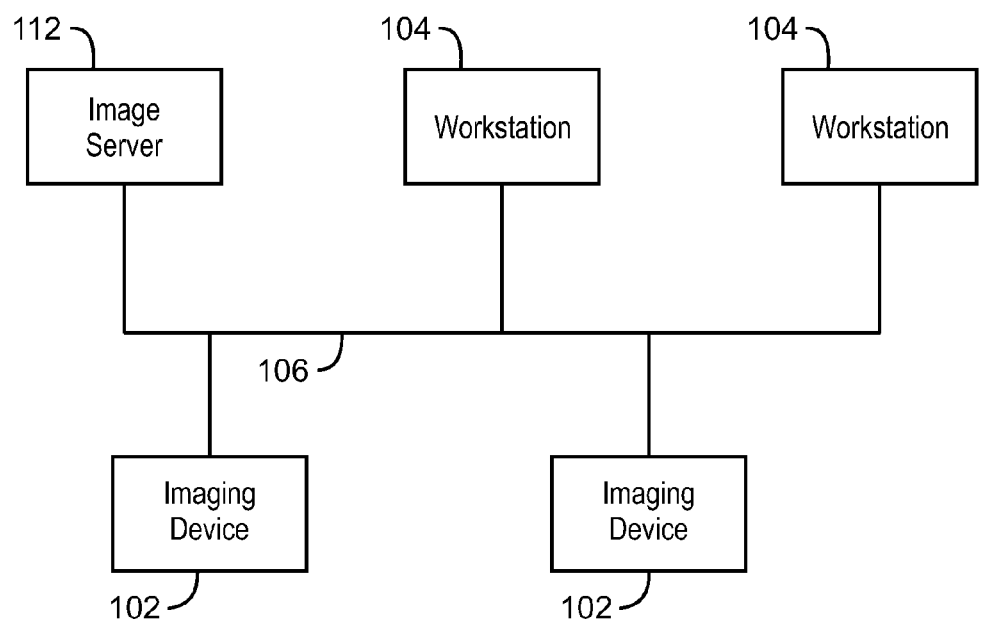
FIG. 1B is a block diagram of a server based embodiment of the imaging system of FIG. 1A.

FIG. 1B is a block diagram of a server based embodiment of the imaging system 100 of FIG. 1A. Like numbered items are as described with respect to FIG. 1A. According to the server based embodiment of the imaging system 100 shown in FIG. 1B, the imaging system 100 includes a number of imaging devices 102 and a number of workstations 104 connected through the communications link 106.

Furthermore, according to the server based embodiment of the imaging system 100 shown in FIG. 1B, the imaging system 100 includes an image server 112. The image server 112 may function as a central image processing and/or management system for the imaging system 100, and may be any suitable type of image archiving server or apparatus. For example, in some embodiments, the image server 112 is a picture archival and communications system (PACS) server.

The image server 112 may include an information storage unit for short-term storage of images generated by the imaging devices 102. In addition, the image server 112 may include an archival storage unit, e.g., an optical disc storage and optical disc reader system, for long-term storage of images generated by the imaging devices 102. Furthermore, the image server 112 may be configured to retrieve any of the images stored in the information storage unit and/or the archival storage unit, and send such images to any of the workstations 104 to be analyzed according to the embodiments described herein.

The block diagram of FIG. 1B is not intended to indicate that the server based embodiment of the imaging system 100 is to include all of the components shown in FIG. 1B in every case. Moreover, any number of additional or alternative components not shown in FIG. 1B may be included in the server based embodiment of the imaging system 100, depending on the details of the specific implementation.

Figure 2:
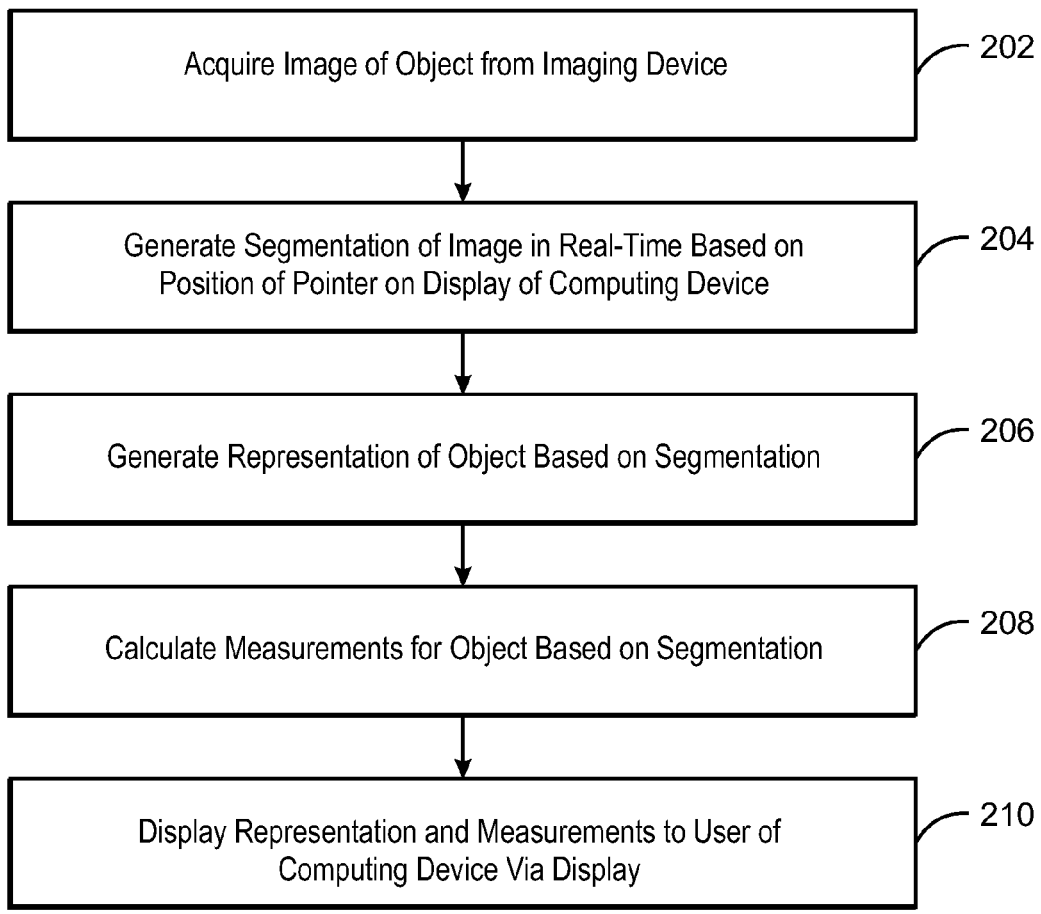
FIG. 2 is a process flow diagram of a method for real-time, interactive image analysis.

FIG. 2 is a process flow diagram of a method 200 for real-time, interactive image analysis. The method 200 may be implemented by any suitable computing device that is capable of processing and analyzing images according to the embodiments described herein. For example, the method 200 may be implemented by the imaging system 100 described with respect to FIGS. 1A and 1B.

The method 200 begins at block 202, at which an image of an object is acquired from an imaging device. The image may be a two-dimensional, three-dimensional, or four-dimensional image, depending on the details of the specific implementation.

At block 204, a segmentation of the image is generated in real-time based on a position of a pointer on a display of the computing device. The segmentation may be a two-dimensional, three-dimensional, or four-dimensional segmentation, depending on the details of the specific implementation. In addition, the manner in which the segmentation is generated may vary depending on whether the segmentation is a two-dimensional, three-dimensional, or four-dimensional segmentation, as described further with respect to FIGS. 3 and 4. Further, in some embodiments, a number of segmentations are generated for the image. For example, a number of two-dimensional segmentations may be generated in a number of different projection planes.

In various embodiments, generating the segmentation of the image in real-time includes continuously updating the segmentation based on changes in the position of the pointer on the display. Specifically, the image may be displayed to the user via a user interface, and the user may move the pointer across the portion of the user interface corresponding to the image in order to pinpoint specific locations on the image. The segmentation of the image may then be updated in real-time based on the movement of the pointer.

At block 206, a representation of the object is generated based on the segmentation. In some embodiments, the representation is a two-dimensional representation of a shape of the object in a specified projection plane. For example, the representation may be an outline of the contours of the object shown in the image. In other embodiments, the representation is a three-dimensional or four-dimensional representation of a volume of the object. For example, the representation may include a two-dimensional representation of the shape of the object, as well as cues that indicate the three-dimensional or four-dimensional extensions of the shape.

In addition, for embodiments in which a number of segmentations are generated for the image, the representation may be generated based on all or a portion of the segmentations. For example, a three-dimensional representation of the object may be generated based on a number of two-dimensional segmentations that have been generated according to different projection planes. Furthermore, in some embodiments, any number of different types of representations of the object may be generated at block 206. For example, the user may specify particular types of representations that are to be generated via the user interface.

At block 208, measurements for the object are calculated based on the segmentation. The measurements may include, but are not limited to, a minimum value, maximum value, average value, area, standard deviation, volume, perimeter, minimum diameter, maximum diameter, largest three-dimensional axis, and/or texture parameters corresponding to the object represented by the image. In some embodiments, the user may specify particular measurements that are to be calculated for the image via the user interface. Furthermore, for embodiments in which a number of segmentations are generated for the image, the measurements may be calculated based on all or a portion of the segmentations. For example, a volume enclosed within an ellipsoid generated by two or more segmentations may be estimated.

At block 210, the representation of the object and the measurements for the object are displayed to the user of the computing device via the display. In various embodiments, the user may adjust the information that is displayed by providing feedback via the user interface. For example, the user may specify particular types of representations or particular measurements for the object represented by the image that are to be presented on the display 110.

Furthermore, in some embodiments, the user may capture an image (or snapshot) of a representation of the object that is of interest to the user. For example, the user may capture a snapshot including a specific view of a particular representation. In addition, the snapshot may include the measurements corresponding to the specific view of the particular representation. In various embodiments, the user may capture snapshots corresponding to different views of any number of representations of the object, and may use such snapshots to analyze the object from different viewpoints.

The process flow diagram of FIG. 2 is not intended to indicate that the blocks of the method 200 are to be executed in any particular order, or that all of the blocks shown in FIG. 2 are to be included in every case. Furthermore, the method 200 may include any number of additional or alternative blocks not shown in FIG. 2, depending on the details of the specific implementation.

In various embodiments, the method 200 may be used to analyze a video that has been broken down into a number of individual images. Specifically, the method 200 may be executed for each individual image, and the results may be combined to provide for the analysis of the video as a whole. In other embodiments, the method 200 may be used to analyze specific frames of the video that are represented by specific images. Specifically, the computing device may play the video, and may then pause the video at a specific frame in response to feedback from the user. The method 200 may then be executed for the image that represents the specific frame that is of interest to the user.

The method 200 may be used for a variety of medical applications. For example, the method 200 may be used to analyze an image of a patient's brain generated via an MRI device in order to identify tumors or other pathological structures within the brain. As another example, the method 200 may be used to analyze an image of a pregnant woman's womb generated via an ultrasonic imaging device in order to identify specific characteristics of the fetus. Moreover, the method 200 may also be used for any number of non-medical applications. For example, the method 200 may be used to analyze an image representing data gathered via a particular mathematical or statistical technique.

Figure 3:
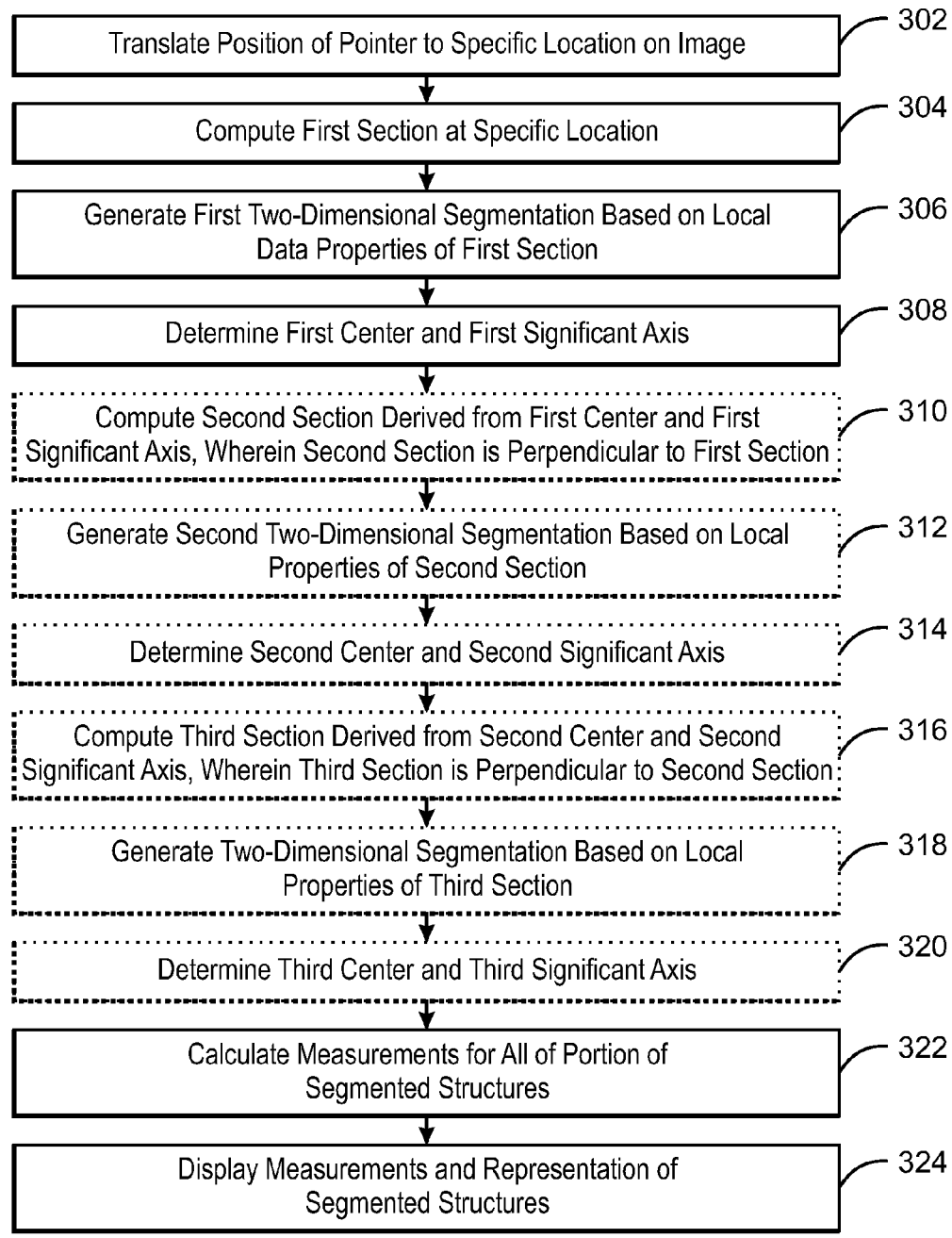
FIG. 3 is a process flow diagram of a method for two-dimensional segmentation and quantification of an image.

FIG. 3 is a process flow diagram of a method 300 for two-dimensional segmentation and quantification of an image. In various embodiments, the method 300 represents a specific implementation of the method 200 described above with respect to FIG. 2. The method 300 may be implemented by any suitable computing system that is capable of processing, and analyzing images according to the embodiments described herein. For example, the method 300 may be implemented by the imaging system 100 described with respect to FIGS. 1A and 1B.

The method 300 begins at block 302 with the translation of the position of the pointer on the display to a specific location on the image of the object. In some cases, more than one image may be presented on the display. In such cases, the particular image that corresponds to the current position of the pointer on the display may be determined, and then the specific location on the particular image may be determined.

At block 304, a first section is computed at the specific location. In various embodiments, computing the first section includes computing a local average and a standard deviation at the specific location, and determining an acceptable pixel range from the average and the standard deviation. Filtering may then be performed to improve the robustness to noise ratio. Such filtering may include, for example, median filtering or sequential filtering based on grey-level closure and opening. Further, in some embodiments, region growing is performed based on the determined pixel range, as well as the shape and distance criteria. For example, region growing may be performed using level set-based operations or simple connectivity techniques that are limited to a maximum distance.

At block 306, a first two-dimensional segmentation of the image is generated based on local data properties of the first section. In some embodiments, the first two-dimensional segmentation is generated in a current projection plane. In addition, at block 308, a first center and a first significant axis corresponding to the first two-dimensional segmentation are determined.

At block 310, a second section that is derived from the first center and the first significant axis may be computed. The second section may be generated in a different plane than the first section. For example, the second section may be generated in a plane that is approximately perpendicular to the plane of the first section. In various embodiments, computing the second section includes computing a local average and a standard deviation at the first center corresponding to the first two-dimensional segmentation, and determining an acceptable pixel range from the average and the standard deviation. Filtering may then be performed to improve the robustness to noise ratio. Such filtering may include, for example, median filtering or sequential filtering based on grey-level closure and opening. Further, in some embodiments, region growing is performed based on the determined pixel range, as well as the shape and distance criteria. For example, region growing may be performed using level set-based operations or simple connectivity techniques that are limited to a maximum distance.

At block 312, a second two-dimensional segmentation of the image may be generated based on local data properties of the second section. The second two-dimensional segmentation of the image may be generated in a different plane than the first two-dimensional segmentation and, thus, may be used to indicate three-dimensional characteristics of the object. At block 314, a second center and a second significant axis corresponding to the second two-dimensional segmentation are determined.

At block 316, a third section that is derived from the second center and the second significant axis may be computed. The third section may be generated in a different plane than both the first section and the second section. In various embodiments, computing the third section includes computing a local average and a standard deviation at the second center corresponding to the second two-dimensional segmentation, and determining an acceptable pixel range from the average and the standard deviation. Filtering may then be performed to improve the robustness to noise ratio. Such filtering may include, for example, median filtering or sequential filtering based on grey-level closure and opening. Further, in some embodiments, region growing is performed based on the determined pixel range, as well as the shape and distance criteria. For example, region growing may be performed using level set-based operations or simple connectivity techniques that are limited to a maximum distance.

At block 318, a third two-dimensional segmentation of the image may be generated based on local data properties of the third section. The third two-dimensional segmentation of the image may be generated in a different plane than the first two-dimensional segmentation and the second two-dimensional segmentation and, thus, may be used to indicate additional three-dimensional characteristics of the object. Further, at block 320, a third center and a third significant axis corresponding to the third two-dimensional segmentation may be determined.

At block 322, measurements are calculated for all or a portion of the segmented structures corresponding to the first, second, and third two-dimensional segmentations. Such measurements may include, but are not limited to, the measurements described above with respect to the method 200 of FIG. 2.

At block 324, the measurements and a representation of the segmented structures are displayed to the user via the display. Moreover, in some embodiments, a number of different representations of the segmented structures are displayed to the user.

The process flow diagram of FIG. 3 is not intended to indicate that the blocks of the method 300 are to be executed in any particular order, or that all of the blocks shown in FIG. 3 are to be included in every case. For example, blocks 310-320 are optional, as indicated by the dotted lines shown in FIG. 3. In some embodiments, blocks 310-314 are included to provide for the generation a second two-dimensional segmentation of the image. In addition, in some embodiments, blocks 316-320 are included to provide for the generation a third two-dimensional segmentation of the image. Furthermore, the method 300 may include any number of additional or alternative blocks not shown in FIG. 3, depending on the details of the specific implementation. For example, any number of additional two-dimensional segmentations of the image may be generated according to the method 300.

Figure 4:
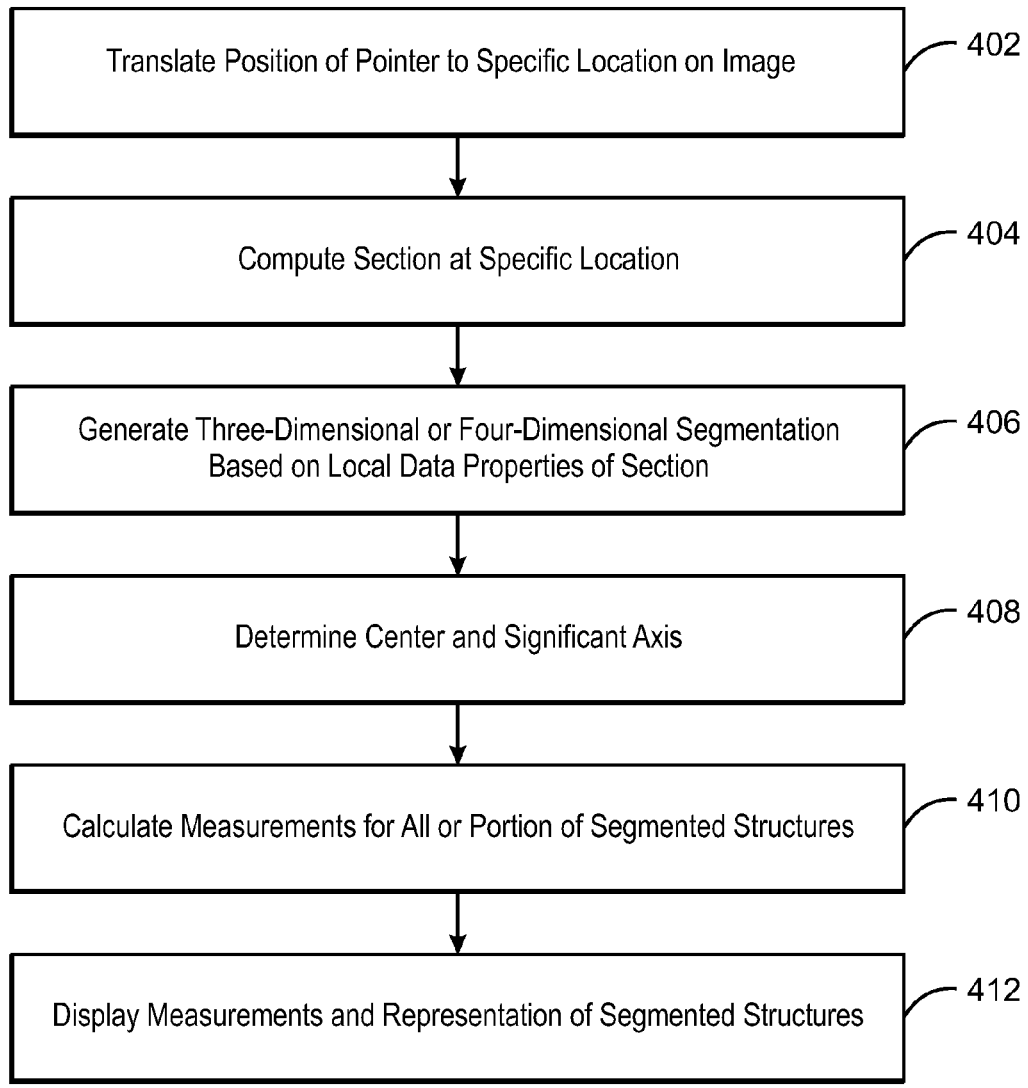
FIG. 4 is a process flow diagram of a method for three-dimensional or four-dimensional segmentation and quantification of an image.

FIG. 4 is a process flow diagram of a method 400 for three-dimensional or four-dimensional segmentation and quantification of an image. In various embodiments, the method 400 represents another specific implementation of the method 200 described above with respect to FIG. 2. The method 400 may be implemented by any suitable computing system that is capable of processing and analyzing images according to the embodiments described herein. For example, the method 400 may be implemented by the imaging system 100 described with respect to FIGS. 1A and 1B.

The method 400 begins at block 402 with the translation of the position of the pointer on the display to a specific location on the image of the object. At block 404, a section is computed at the specific location. In various embodiments, computing the section includes computing a local average and a standard deviation at the specific location, and determining an acceptable pixel range from the average and the standard deviation. Filtering may then be performed to improve the robustness to noise ratio. Such filtering may include, for example, median filtering or sequential filtering based on grey-level closure and opening. Further, in some embodiments, region growing is performed based on the determined pixel range, as well as the shape and distance criteria. For example, region growing may be performed using level set-based operations or simple connectivity techniques that are limited to a maximum distance.

At block 406, a three-dimensional or four-dimensional segmentation of the image is generated based on local data properties of the section. In addition, at block 408, a center and a significant axis corresponding to the three-dimensional or four-dimensional segmentation are determined.

At block 410, measurements are calculated for all or a portion of the segmented structures corresponding to the three-dimensional or four-dimensional segmentation. Such measurements may include, but are not limited to, the measurements described above with respect to the method 200 of FIG. 2. If the segmentation is a four-dimensional segmentation of the image, the measurements may also include any number of additional parameters, such as time, corresponding to the four-dimensional segmentation. Further, at block 412, the measurements and a representation of the segmented structures are displayed to the user via the display.

The process flow diagram of FIG. 4 is not intended to indicate that the blocks of the method 400 are to be executed in any particular order, or that all of the blocks shown in FIG. 4 are to be included in every case. Furthermore, the method 400 may include any number of additional or alternative blocks not shown in FIG. 4, depending on the details of the specific implementation. For example, any number of additional three-dimensional or four-dimensional segmentations of the image may be generated according to the method 400.

Figure 5:
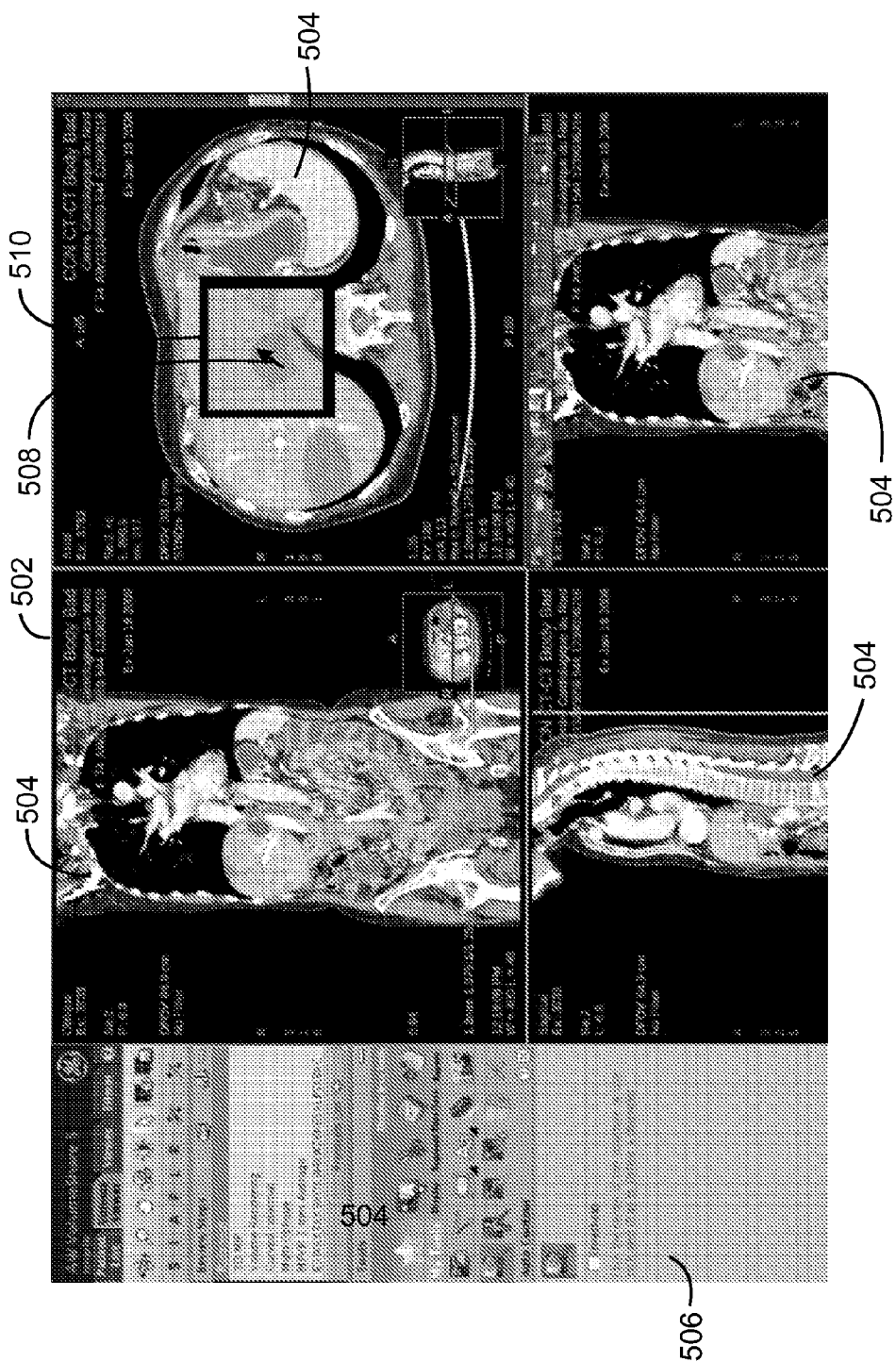
FIG. 5 is a schematic of a display including a user interface that may be used according to embodiments described herein.

FIG. 5 is a schematic of a display 500 including a user interface 502 that may be used according to embodiments described herein. The user interface 502 may include a number of images 504 representing one or more objects being imaged by an imaging device. The user interface 502 may also include a side bar 506 including a number of options and tools that may be controlled by a user of the computing device.

In various embodiments, the user interface 502 provides for the analysis of the images 504 in response to feedback from the user. Specifically, the user interface 502 may allow the user to control a procedure for segmenting and quantifying an image 504 by moving a pointer 508 to a specific position on the display 500. In response to the user moving the pointer 508 to the specific position on the display 500, the position of the pointer 508 may be translated into a corresponding location on the image 504. A section 510 of the image 504 may then be computed based on the corresponding location on the image 504. In various embodiments, the section 510 is a two-dimensional slice of the image 504.

Figure 6:
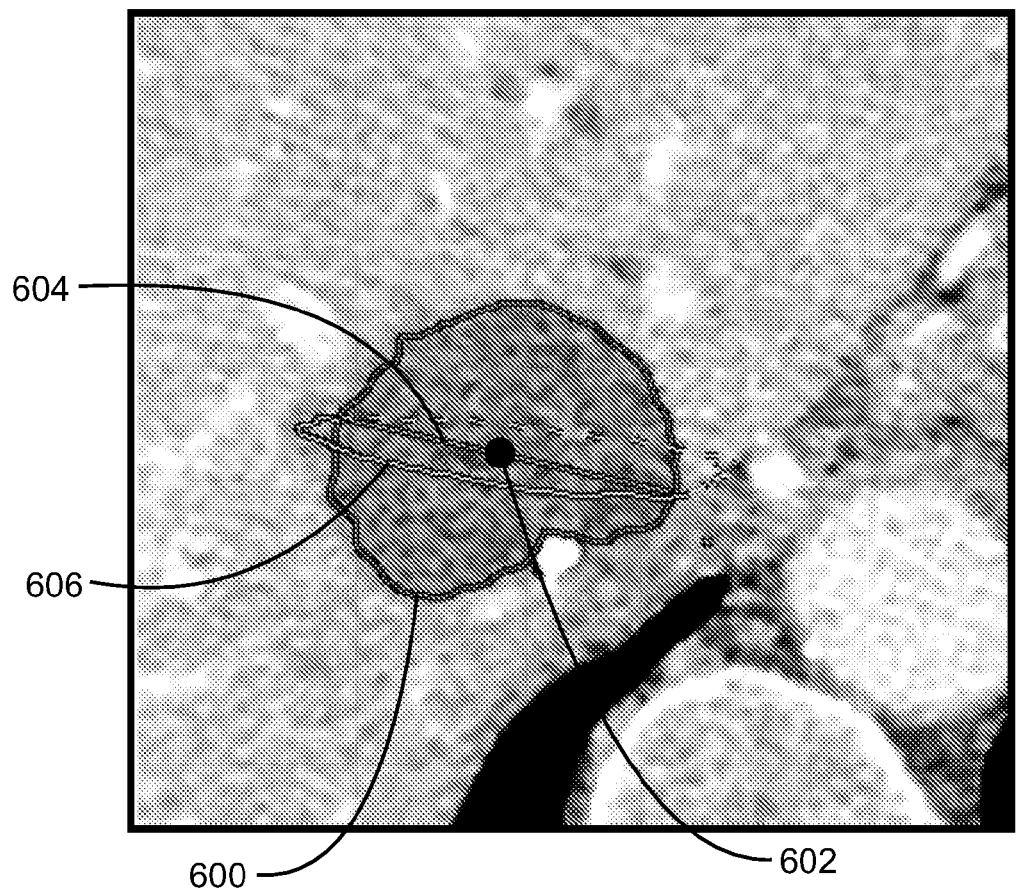
FIG. 6 is a schematic of the section of the image described with respect to FIG. 5.

The segmentation and quantification procedure may then be executed for the section 510 of the image 504 corresponding to the current position of the pointer 508, as discussed further with respect to FIG. 6. Moreover, according to embodiments described herein, the segmentation and quantification procedure may be continuously updated as the position of the pointer 508 changes and, thus, different sections of the image 504 (or different regions of the same section) are identified.

FIG. 6 is a schematic of the section 510 of the image 504 described with respect to FIG. 5. Like numbered items are as described with respect to FIG. 5. According to embodiments described herein, the local data properties of the section 510 may analyzed to identify a region of the section 510 that may be of interest to the user. For example, a region of the section 510 including properties that are distinct from the rest of the section 510 may indicate the existence of some type of pathological structure in that region. Therefore, that region may be determined to be of interest to the user.

Once such a region has been identified, a first two-dimensional segmentation 600 of the section 510 of the image 504 may be generated for that region. In the embodiment shown in FIG. 6, the first two-dimensional segmentation 600 includes an outline of a shape of a specific object, such as a pathological structure, corresponding to the segmentation in the current projection plane.

In various embodiments, a center 602 and a significant axis 604 corresponding to the first two-dimensional segmentation 600 may be determined. In the embodiment shown in FIG. 6, the significant axis 604 is the largest diameter corresponding to the first two-dimensional segmentation 600. However, the significant axis 604 may also be an axis that is automatically determined by the computing device, or an axis that is specified by the user of the computing device. In some embodiments, the center 602 and the significant axis 604 corresponding to the first two-dimensional segmentation 600 may be used to calculate specific measurements corresponding to the object of interest.

Furthermore, the center 602 and the significant axis 604 may be used to generate a second two-dimensional segmentation 606 corresponding to the identified region of the image 504. The second two-dimensional segmentation 606 may include an outline of an extension of the object in a plane that is approximately perpendicular to the current projection plane. Therefore, the second two-dimensional segmentation 606 may be used to determine specific three-dimensional characteristics of the object.

While embodiments are described herein with respect to imaging devices used in the medical field, the reference to medical imaging devices may be interpreted broadly. Embodiments described herein can encompass those situations in which any imaging device is used to capture two-dimensional, three-dimensional, and/or four-dimensional images. Further, those of skill in the art will recognize that the present techniques are applicable to many different hardware configurations, software architectures, organizations, or processes.

While the detailed drawings and specific examples given describe particular embodiments, they serve the purpose of illustration only. The systems and methods shown and described are not limited to the precise details and conditions provided herein. Rather, any number of substitutions, modifications, changes, and/or omissions may be made in the design, operating conditions, and arrangements of the embodiments described herein without departing from the spirit of the present techniques as expressed in the appended claims.

The invention claimed is:

1. A system for real-time, interactive image analysis, comprising:
   a computing device comprises a processor configured to:
      acquire an image from an imaging device;
      generate a segmentation of the image in real-time based on a position of a movable pointer on the display and update the segmentation based on a change to the position of the pointer on the display, wherein the segmentation is generated by the computing device configured to:
         translate the position of the pointer to a location on the image;
         compute a first section at the location;
         generate at least one of a first three-dimensional segmentation of the image or a first four-dimensional segmentation of the image based on the first section; and
         determine a first center and a first significant axis corresponding to the at least one of a first three-dimensional segmentation of the image or a first four-dimensional segmentation of the image;
      generate a representation of the object based on the segmentation, wherein the representation is simplified from the image of the object and includes an outline of the object based on the generated segmentation including the first center and the first significant axis;
      calculate measurements for the object based on the segmentation including the first center and the first significant axis; and
      display the representation and the measurements via the display,
   wherein the computing device is configured to dynamically update the segmentation, which triggers an update in the representation, which triggers an update in the measurements, as the position of the pointer on the display with respect to the image changes based on pointer movement.

2. The system of claim 1, wherein the computing device is further configured to:
   compute a second section derived from the first center and the first significant axis;

generate at least one of a second three-dimensional segmentation of the image or a second four-dimensional segmentation of the image based on the second section; and determine a second center and a second significant axis corresponding to the at least one of a second three-dimensional segmentation of the image or a second four-dimensional segmentation of the image.

3. The system of claim 1, wherein the representation comprises a three-dimensional or four-dimensional representation of a volume of the object.

4. The system of claim 1, wherein measurements are calculated for a portion of the object corresponding to the at least one of a three-dimensional segmentation of the image or a four-dimensional segmentation of the image.

5. The system of claim 1, wherein measurements include one or more of a minimum value, maximum value, average value, area, standard deviation, volume, perimeter, minimum diameter, maximum diameter, largest three-dimensional axis, or texture parameter.

6. The system of claim 1, wherein the segmentation comprises a first three-dimensional segmentation of the image generated based on a plurality of two-dimensional segmentations each generated according to a different projection plane.

7. The system of claim 1, wherein the computing device is further configured to capture a snapshot of the representation including a selected view of the representation.

8. A computer-implemented method for real-time, interactive image analysis, comprising:

acquiring, at a computing device, an image of an object from an imaging device;

generating a segmentation of the image in real-time based on a position of a movable pointer on a display of the computing device and updating the segmentation based on a change to the position of the pointer on the display, wherein the segmentation is generated, using the computing device, by:

translating the position of the pointer to a location on the image;

computing a first section at the location;

generating at least one of a first three-dimensional segmentation of the image or a first four-dimensional segmentation of the image based on the first section; and determining a first center and a first significant axis corresponding to the at least one of a first three-dimensional segmentation of the image or a first four-dimensional segmentation of the image;

generating a representation of the object based on the segmentation, wherein the representation is simplified from the image of the object and includes an outline of the object based on the generated segmentation including the first center and the first significant axis; and calculating measurements for the object based on the segmentation including the first center and the first significant axis; and displaying the representation and the measurements via the display, wherein the computing device is configured to dynamically update the segmentation, which triggers an update in the representation, which triggers an update in the measurements, as the position of the pointer on the display with respect to the image changes based on pointer movement.

9. The method of claim 8, further comprising characterizing the object based on the segmentation.

10. The method of claim 8, further comprising:

computing a second section derived from the first center and the first significant axis;

generating at least one of a second three-dimensional segmentation of the image or a second four-dimensional segmentation of the image based on the second section; and determining a second center and a second significant axis corresponding to the at least one of a second three-dimensional segmentation of the image or a second four-dimensional segmentation of the image.

11. The method of claim 8, further comprising capturing a snapshot of the representation of the object from a specified viewpoint.

12. The method of claim 8, wherein measurements are calculated for a portion of the object corresponding to the at least one of a three-dimensional segmentation of the image or a four-dimensional segmentation of the image.

13. The method of claim 8, wherein the segmentation comprises a first three-dimensional segmentation of the image generated based on a plurality of two-dimensional segmentations each generated according to a different projection plane.

14. A non-transitory computer-readable storage medium including instructions which, when executed by a processor, program a computing device including the processor to implement a method, the method comprising:

acquiring, at the computing device, an image of an object from an imaging device;

generating a segmentation of the image in real-time based on a position of a movable pointer on a display of the computing device and updating the segmentation based on a change to the position of the pointer on the display, wherein the segmentation is generated, using the computing device, by:

translating the position of the pointer to a location on the image;

computing a first section at the location;

generating at least one of a first three-dimensional segmentation of the image or a first four-dimensional segmentation of the image based on the first section; and determining a first center and a first significant axis corresponding to the at least one of a first three-dimensional segmentation of the image or a first four-dimensional segmentation of the image;

generating a representation of the object based on the segmentation, wherein the representation is simplified from the image of the object and includes an outline of the object based on the generated segmentation including the first center and the first significant axis; and calculating measurements for the object based on the segmentation including the first center and the first significant axis; and displaying the representation and the measurements via the display, wherein the computing device is configured to dynamically update the segmentation, which triggers an update in the representation, which triggers an update in the measurements, as the position of the pointer on the display with respect to the image changes based on pointer movement.

15. The computer-readable storage medium of claim 14, wherein the method implemented by the computing device further comprises characterizing the object based on the segmentation.

16. The computer-readable storage medium of claim 14, wherein the method implemented by the computing device further comprises:

computing a second section derived from the first center and the first significant axis;

generating at least one of a second three-dimensional segmentation of the image or a second four-dimensional segmentation of the image based on the second section; and determining a second center and a second significant axis corresponding to the at least one of a second three-dimensional segmentation of the image or a second four-dimensional segmentation of the image.

17. The computer-readable storage medium of claim 14, wherein the method implemented by the computing device further comprises capturing a snapshot of the representation of the object from a specified viewpoint.

18. The computer-readable storage medium of claim 14, wherein measurements are calculated for a portion of the object corresponding to the at least one of a three-dimensional segmentation of the image or a four-dimensional segmentation of the image.

19. The computer-readable storage medium of claim 14, wherein the segmentation comprises a first three-dimensional segmentation of the image generated based on a plurality of two-dimensional segmentations each generated according to a different projection plane.

20. The computer-readable storage medium of claim 14, wherein the object comprises a portion of human anatomy.

* * * * *